United States Patent
Cannon et al.

[11] 3,768,459
[45] Oct. 30, 1973

[54] CERVICAL DILATION MEASURING DEVICE

[75] Inventors: Emerson T. Cannon; Richard M. Hebertson, both of Salt Lake City, Utah

[73] Assignee: Utah Research & Development Co., Inc., Salt Lake City, Utah

[22] Filed: June 28, 1971

[21] Appl. No.: 157,154

[52] U.S. Cl. .................. 128/2 S, 340/248, 340/282
[51] Int. Cl. .............................................. A61b 5/05
[58] Field of Search ................ 128/2 R, 2 S, 2.1 R, 128/2.05 R, 1.3, 1.5; 33/174 D; 340/248, 279, 282

[56] References Cited
UNITED STATES PATENTS

| | | | |
|---|---|---|---|
| 3,273,559 | 9/1966 | Evans | 128/2 S |
| 3,526,886 | 9/1970 | Lubich | 340/282 |
| 3,547,106 | 12/1970 | Bornmann | 128/2 R |
| 2,393,717 | 1/1946 | Speaker | 128/1.5 |
| 3,439,358 | 4/1969 | Salmons | 128/2 S |
| 3,606,879 | 9/1971 | Estes | 128/2 S |

Primary Examiner—William E. Kamm
Attorney—William S. Britt et al.

[57] ABSTRACT

A measuring device for measuring cervix dilation is disclosed. The device comprises a miniature signal transmitting device attached to one side of the cervix, said transmitting device generating a signal whose intensity varies with the distance from said transmitting device. A miniature receiving device attached to or placed against an opposite side of the cervix from said transmitting device receives the transmitted signal and generates a signal proportional to said transmitted signal. The signal from said receiving device is passed through translation means to provide a visible display of the intensity of said transmitted signal. The intensity of said transmitted signal is proportional to the distance between the transmitting device and the receiving device.

10 Claims, 7 Drawing Figures

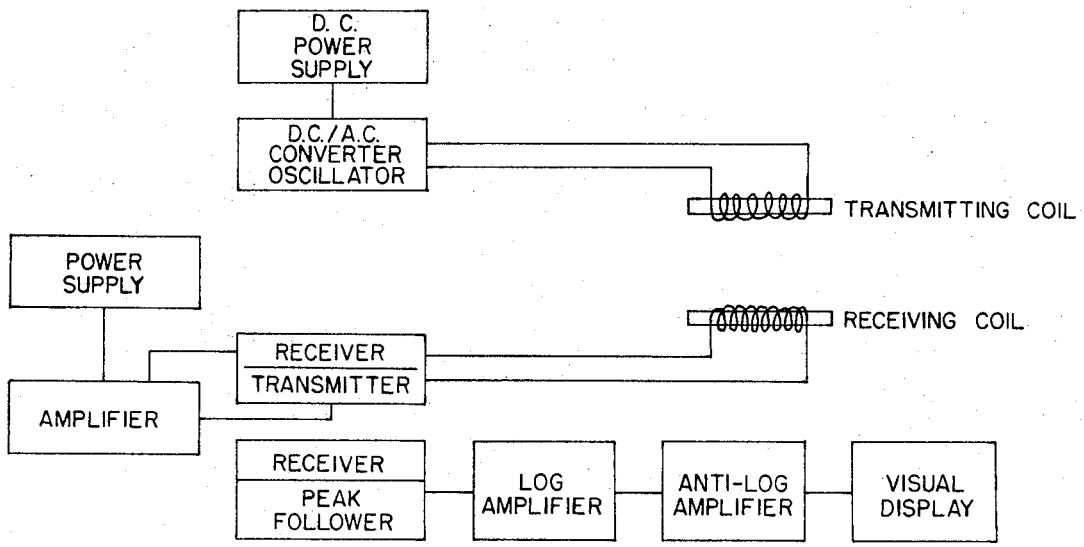

CERVICAL DILATION MEASURING DEVICE

BACKGROUND OF THE INVENTION

1. Field

Frequent measurement of cervical dilation is required upon a prospective mother during the period immediately prior to childbirth. Present means for physically measuring the distance between cervical walls adds to the discomfort of the patient and requires frequent attention of medical personnel. Means of remotely measuring or at least remotely displaying a periodically or continuously monitored measurement of cervix dilation is desired.

Prior Art

No prior art technique for applying electrical or electronic means to measuring cervix dilation is known to applicant. The following patents describe electrical or electronic means generally for measuring distances.

U.S. Pat. No. 3,387,496 of Cornelius describes an apparatus for measuring extremely small distances, for example, one-one millionth of a millimeter. The apparatus of Cornelius utilizes variation in inductance or capacitance caused by physical changes in an LRC circuit, resulting in a change in the frequency at which said LRC circuit oscillates, thereby indicating the distance measured. The distance may be measured by varying the distance between the plates of a capacitor and measuring the new capacitance. The change in capacitance changes the frequency at which the circuit oscillates. Also, a pair of coils are utilized in which a change in inductance is caused by movement of the core within a coil.

U.S. Pat. No. 2,369,909 of Mestas describes a device for measuring the internal diameter of tubes and the like wherein a primary coil and two secondary coils are physically aligned and contained within a cylindrical structure. An elongated armature, pivoted at one end, swings through a very short arc at the free end, thereby causing unequal air gaps to exist between said armature and said secondary coils, resulting in current flow in an ordinarily balanced circuit.

Another patent of interest is U.S. Pat. No. 2,736,967 of Doll wherein an electrical means is disclosed for measuring the diameter of underground shafts. A transmitting coil or rotating magnet and receiving coil are made part of a well-logging and caliper device transported through a borehole. The caliper portion of the device comprises one coil attached to spring-like members in contact with the borehole wall and another coil located in a central member of the caliper device. Variation of the distance between coils causes a change in intensity of current induced in one of the coils thereby providing a signal proportional to the borehole diameter.

OBJECTS OF THE INVENTION

To provide means for substantially constantly measuring cervical dilation.

To provide means for attaching to the cervix a transmitting device and a receiving device whereby an electromagnetic signal is transmitted whose character at the receiving device is dependent upon the degree of cervical dilation.

To provide means for remotely displaying the degree of cervix dilation present in a prospective mother at any given moment.

To provide means for recording the degree of cervical dilation present in a prospective mother.

To provide a cervix measuring device wherein at least a portion of the components thereof are physically attached to the cervix near its opening and which are substantially unaffected by body fluids.

To provide a cervix measuring device which causes substantially no risk or harm to a prospective mother or fetus.

To provide a cervix measuring device wherein the accuracy of measurement is greater than about 95 percent.

DESCRIPTION OF THE INVENTION

A measuring apparatus for periodically or continuously measuring cervical dilation of a prospective mother has now been invented. The apparatus comprises at least one miniature signal transmitting device attached to the cervical wall which transmits an electromagnetic signal, a signal receiving device for receiving said transmitted signal wherein the character of said signal correlates with the diameter of the cervical opening and display means interacting with said receiving means to display the received signal in a manner which indicates cervical dilation.

Further understanding of the invention may be facilitated by reference to the accompanying drawings.

FIG. 1 is a block diagram of a cervix measuring device utilizing a transmitting coil and a receiving coil.

FIG. 2 is a perspective view of an encapsulated coil for attachment to a cervix wall.

FIG. 3 is a block diagram of a cervix measuring device utilizing a self-contained transmitting-receiving coil system which transmits a distance-proportional signal to a remote receiver.

Figure 4:
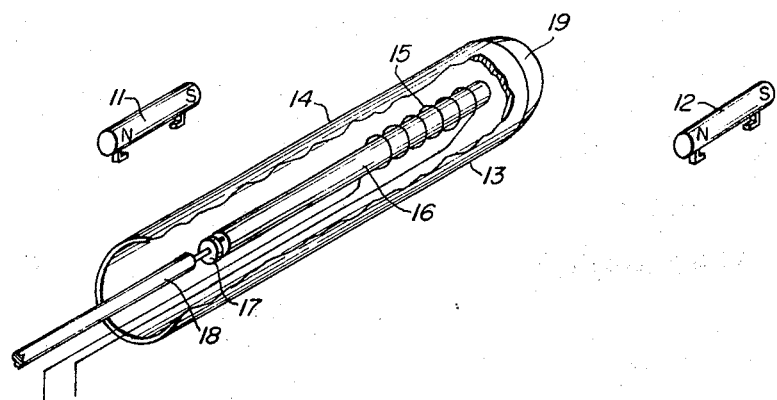
FIG. 4 is a perspective view of a cervix measuring probe and permanent magnet transmitters.

A preferred embodiment of the invention is illustrated in FIG. 1. A signal generator supplies an alternating current having low voltage, generally less than about 25 volts and preferably less than about 10 volts, and very low power, generally less than 100 milliwatts and preferably less than 50 milliwatts, to a transmitting coil, Coil A. The frequency of the current supplied to Coil A depends, at least partly, upon the properties of Coil A. The frequency of the alternating current supplied to Coil A preferably matches the resonant frequency of the coil or at least falls within the band-pass of the coil.

The alternating current passing through Coil A induces an alternating current in Coil B. The voltage of the current produced in Coil B depends upon the amount of voltage impressed upon Coil A, the frequency of the current in Coil A, the characteristics of Coil A and Coil B, and the distance between Coil A and Coil B. The voltage produced in Coil B is inversely proportional to the cube of the distance between Coils A and B. Therefore, the voltage produced in Coil B for a given impressed voltage, frequency and coil characteristics will be ⅛ as great at a spacing of two centimeters between the coils as occurs with a spacing of one centimeter.

The induced voltage in Coil B is an alternating current of potentially the same frequency as that impressed upon Coil A. The alternating current from Coil B is passed through a peak follower which measures the maximum voltage in each cycle and produces a direct current which corresponds to the peak voltage of the alternating current. An exponential relationship between distance and voltage still exists. The direct current from the peak follower is passed through a log amplifier which amplifies the voltage. Although the distance between Coils A and B could be determined by using a log graph and charting the voltage readings from the log amplifier thereon it is preferred to pass the amplified direct current to an anti-log amplifier which takes the anti-log of the input voltage and establishes a linear relationship between the voltage and distance existing between Coils A and B. The current from the anti-log amplifier can be passed into a visual display device wherein the distance may be represented digitally or graphically to provide a continuous chart of the various distances existing between Coil A and Coil B over a given period of time. Oscilliscopes, digital read-out devices, recorders and the like are useful display devices.

The signal generator of FIG. 1 may be a conventional signal generator for generating alternating currents of frequencies from about 50 kilocycles per second to about 1000 kilocycles per second (KCS) although it is generally preferred to use frequencies less than about 550 KCS so that interference by commercial radio transmissions will not occur. Inasmuch as a portion of the device comprises an encapsulated coil in contact with a human patient, it is preferred that ultra high frequencies be avoided and that voltages of less than 25 volts at low power levels, i.e. below 50 milliwatts be utilized.

The signal generator preferably operates on 110 volts input, however, a transformer cannot be used to transform 110 volts to the low voltage desired inasmuch as the power level would be excessive. Direct current from a dry cell producing 5 to 10 volts or more can be passed through an oscillator or other direct current to alternating current converter for use in devices of this invention.

The peak follower, log amplifiter, anti-log amplifier and visual display components are commercially available items or items which can be constructed of conventional design.

Coils A and B are preferably identical in size and construction. The coils are preferably encapsulated in a resinous substance to protect the coils from body fluids. The encapsulating material, of course, should not interfere with the electro-magnetic properties of the coil. The coils are preferably attached to the cervix by clamps or other appropriate means, see FIG. 2, and are preferably small in size. The maximum dimension of a coil consistant with comfort to the patient is about ½ inch and a maximum dimension of ¼ inch is preferred. Because of the size limitations a small core and fine wire must be utilized in forming the coils.

One preferred coil construction comprises a small ferrite core having dimensions of about 1.75 millimeters by two millimeters by five millimeters wherein about 200 turns of number 39 wire is taken thereabout.

The resonant frequency of coils of this construction is between about 350 and 400 KCS. It is preferred, generally, that both coils of the system of FIG. 1 have substantially the same construction, that is, identical core size, core material and an identical number of turns of the same type and size of wire.

Although the dimensions of the core, core material, size of wire and number of turns of wire on the coil can be varied substantially from that described above, it is preferred that the coil be constructed to have maximum inductance for its size. It is further preferred that each coil be identical in construction so that each will operate at the same resonant frequency and therefore provide greatest efficiency of operation. Maximum efficiency is preferred inasmuch as it is very desirable to operate the system at low power and low voltage to minimize any potential danger to the patient or fetus.

A ferrite core is preferred and it is generally preferred that at least about 100 turns be present on each coil. The inductance of the coil may be increased by increasing the number of turns and/or increasing the cross-sectional area of the core and/or decreasing the length of the core. The resonant frequency of the coil is inversely proportional to the square root of the inductance. Therefore, those things which increase the inductance generally lower the resonant frequency. Besides improving the efficiency of the system, operation at resonant frequency eliminates the necessity of calibrating the measuring device each time it is used. The inductance of coils useful in this invention may be any convenient value and may be varied over a very broad range.

When a voltage of 10 volts at 350 to 400 KCS is applied to Coil A having the construction described hereinabove, a voltage of 1 millivolt in Coil B is induced at a distance of about 16 centimeters. Inasmuch as the induced voltage is inversely proportional to the cube of the distance between Coils A and B, under these conditions an induced voltage of 8 millivolts would occur in Coil B at a distance of 8 centimeters. The voltage induced in Coil B can be proportionately increased by increasing the voltage applied to Coil A. Under the same conditions of frequency, a 2 millivolt induced voltage would occur in Coil B when 20 volts are applied to Coil A.

An accuracy of about one-quarter centimeter is preferred for the measuring device of this invention. Using commercial components or components of conventional design, an accuracy of plus or minus one millivolt is easily attained. Therefore, for each one centimeter, a voltage differential of at least four millivolts is desired.

The coils utilized in this invention frequently are high Q devices inasmuch as the resistance of the coil is low in relation to its inductance. Such coils, therefore, have a narrow frequency bandpass. However, a broader band-pass coil can be obtained by artificially introducing greater resistance into the circuit. This increases the power required. Although a broad band-pass coil is advantageous, a substantial increase in power beyond a 100 millivolt limit in a cervical measuring device is undesirable.

A pair of coils in the system of FIG. 1 is required for each patient. However, a plurality of patients can be served by utilizing a plurality of pairs of coils, each pair constructed to operate at a different resonant frequency. Through use of a switching device and a variable frequency signal operator, more than one patient could be served without duplication of translation components. A periodic reading for each frequency could be provided.

The coil shown in FIG. 2 is typical of those useful in this invention. As indicated hereinabove, the maximum dimension in any direction should not exceed one-half inch while a maximum, dimension of not greater than about one-quarter inch is preferred. The coil illustrated has a cylindrical body 11 with a pair of opposed clamps 10 which may be used for attaching the coil to flesh in the cervix region. A single arrow-shaped barb is another convenient way of attaching each coil to the patient. The coil may be of any desired shape, although a square or round core provides the greatest cross-sectional area consistent with small dimensions. A thin, flat coil has some advantage, however, in that it can be placed in the cervical region without unduly projecting from the tissue to which it is attached.

As indicated hereinabove, the coils forming part of the measuring device of this invention are encapsulated in a resinous or other material which does not interfere with the electro-magnetic field being generated and which protects the coil from contact with body fluids. Very fine wire having very thin insulation is used in winding coils. The thin wire and insulation thereon renders the coils subject to being easily damaged. The coils must be encapsulated (potted) to protect the fine wire from breakage and from being shorted through contact of body fluids. Also, the fine wires are easily broken and are protected from physical damage by the encapsulating material.

During encapsulation, care must be taken to avoid elevated temperatures inasmuch as this destroys the insulation on the wires. Also, extreme pressures cannot be used to mold resinous material about the coils because of the fragile nature of the wire involved. Preferred encapsulating materials are room-temperature curing materials or thermoplastic materials which can be easily molded at temperatures less than about 250°F. Room-temperature curing polysilicone resins have been found useful for this purpose. The resins used for encapsulation of coils should be substantially moisture impermeable, resistant to alcohol or ether sterilization and be formable or curable at sufficiently low temperatures to avoid removing the insulation from the fine wires in the coil. Thermoplastic resins such as polystyrene and polyvinylidene chloride (Saran) are useful while thermosetting resins which cure at room temperature such as polysiloxanes and polybutenes can be used. Temperature limitations of the encapsulating resin are dependent upon the wire coating, therefore, if temperature-resistant wire coatings are used higher temperature curing resins can be utilized.

In FIG. 3 a slightly different arrangement is illustrated for the cervix measuring device. A D. C. power supply, such as a miniature dry cell, supplies current to a D.C./A.C. converter such as an oscillator which supplies alternating current of a desired frequency to the transmitting coil. The voltage induced in the receiving coil is transmitted to a receiver and further transmitted to an amplifier which is also powered by miniature power supply. The amplified, induced signal is fed to a transmitter which then transmits an electromagnetic wave proportional in intensity to the signal received from the receiving coil. The amplified, transmitted signal is received by a remote receiver and fed to a peak follower and ultimately into a log amplifier, antilog amplifier and visual display device. An advantage of this system provides a power supply, a converter for the transmitting coil and a power supply, amplifier and receiver and transmitter for the receiving coil which all can be attached to the patient or in the vicinity of the patient without requiring leads to be run from the patient to the peak follower and associated components.

In FIG. 4 a cervix measuring device utilizing one or a pair of permanent magnets is illustrated. The apparatus illustrated in FIG. 4 performs effectively when a single permanent magnet 12 is utilized and the probe 13 is placed against the opposite cervix wall. The probe 13 comprises a plastic, tubular outer-shell 14 containing a coil 15 which is vibrated at a substantially constant rate so that a voltage is induced in the coil when it is placed in the presence of a magnetic field. The coil 15 is preferably wound upon a core 16 which may be vibrated mechanically such as contacting an eccentric wheel 17 rotated through a flexible coupling 18 by a remote motor. The core 16 may be spring-loaded or in contact with resilient filler 19 at the end of the core opposite the eccentric wheel 17.

The coil 15 should preferably be reciprocated at a relatively fast rate so that a slight movement of the probe during the recording of the voltage would not substantially interfere or lead to an erroneous reading.

The voltage induced in the vibrating coil 15 of probe 13 will be dependent upon the reciprocating frequency of the coil and the flux density of the permanent magnet. If the flux density of the magnet and the reciprocating frequency of the coil are each substantially constant, then the induced voltage in coil 15 is dependent upon the distance between the permanent magnet and the coil. It is necessary, therefore, to replace the probe in substantially the same position on the cervix wall opposite from the permanent magnet for each succeeding measurement.

The advantage of this system resides in its simplicity and lack of connecting wires and components attached to the patient. The only component attached to the patient is a small permanent magnet which is secured to the tissue adjacent one cervix wall. No other components are attached to the patient and remote recording device. Another advantage of this device is that the device may be used substantially concurrently with a number of patients.

The voltage induced in coil 15 is preferably passed through a peak follower and amplification and display system of the type illustrated in FIG. 1. The system illustrated in FIG. 4 is advantageous inasmuch as body fluids and other environmental factors do not affect the flux generated by the permanent magnet. The permanent magnet need not be encapsulated. The flux density may be increased by attaching two or more permanent magnets adjacently to one wall of the cervix.

Figure 5:
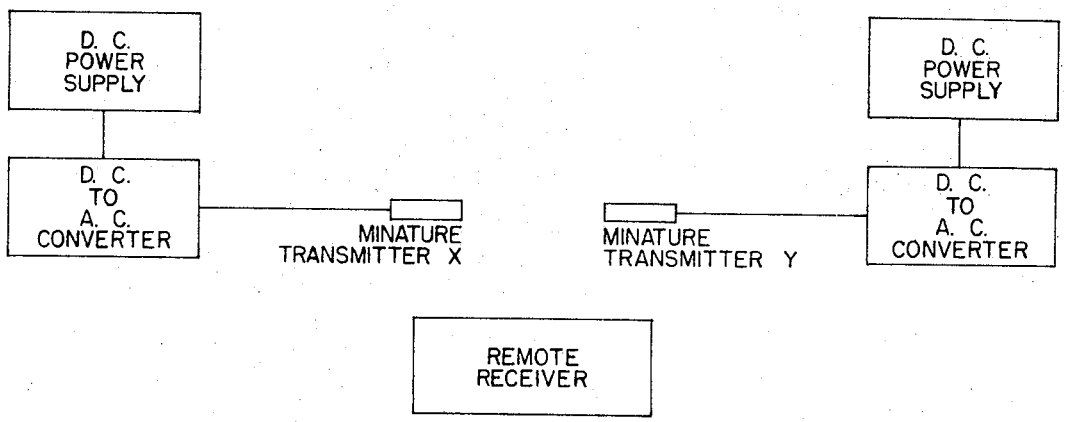
FIG. 5 is a block diagram of a cervix measuring device wherein a pair of transmitting devices attached to opposite cervix walls transmit signals of different frequencies to a remote receiver.

The measuring device illustrated in FIG. 5 utilizes a pair of miniature transmitters X and Y wherein the frequency of the signal transmitted is different for each transmitter. The system is illustrated as having a D.C. power supply feeding D.C. to A.C. converter which powers the miniature transmitter which may, of course, be a coil similar to the coils described in reference to FIGS. 1 and 2 whereby each transmitter operates on a substantially different frequency. A remote receiver receives the signals transmitted by both transmitter X and Y. The interference frequency generated by transmitters X and Y will change as the distance changes between transmitters X and Y. The remote receiver is calibrated to determine the distance existing between X and Y depending upon the interference of the frequency received. Transmitters X and Y are attached to opposite walls of the cervix and it is preferred that the remote receiver be placed in a stationary position with regard to the patient. Also, a probe of the type described in FIG. 4 can be utilized within the cervical opening to determine the interference frequency. A probe utilized with a system such as that illustrated in FIG. 5 does not have to have an oscillating or vibrating coil inasmuch as the signals generated by transmitters X and Y would be alternating in nature.

Figure 6:
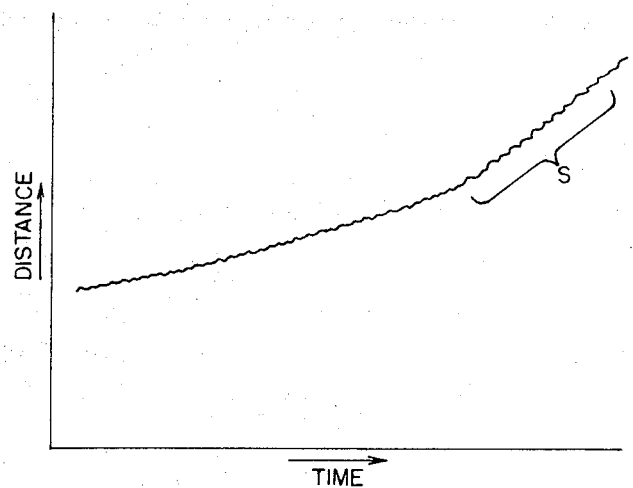
FIG. 6 is a chart typifying a continuous plot of cervical dilation distance against time.
Figure 7:
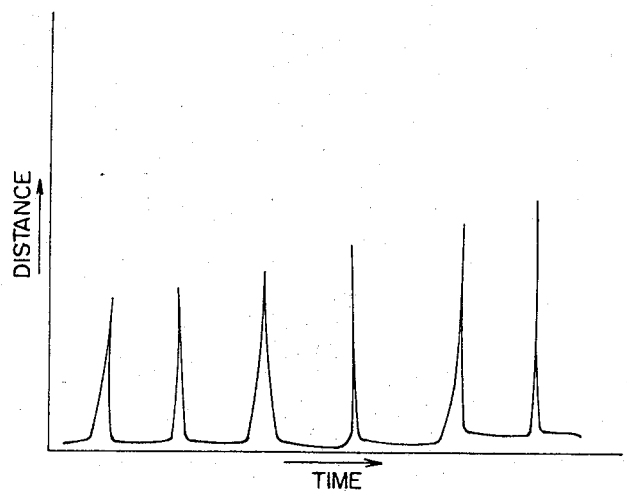
FIG. 7 is a chart typifying a periodic plot of cervical dilation distance against time.

FIGS. 6 and 7 show one type of visual display which may be produced by the measuring device of this invention. FIG. 6 illustrates a continuous chart in which dilation distance is plotted against time. A continuous recording chart can be utilized for this purpose as part of the visual display mentioned in regard to FIGS. 1, 3 and 5. A continuous plot of the cervical opening against time can be recorded and visually observed periodically by medical attendants. In connection with such a display, an audible signal can be actuated whenever the chart indicates that a certain predetermined cervix opening had been reached. Also, a continuous recording of the cervix opening makes changes in the rate of cervical dilation visually observable, as shown by the change in slope of the line in FIG. 6, designated by the length "S". A continuous measurement and continuous recording provides maximum monitoring of the patient and provides the medical attendant with the maximum of information on the progress of dilation. Also, should dilation prematurely terminate the visual display would render this fact readily discernable, as shown in FIG. 6. By having several displays located centrally, a single medical attendant could monitor the progress of one or more patients efficiently.

A continuous chart of the type illustrated in FIGS. 6 provides diagnostic and historical information on childbirth characteristics for each mother. Also, such a record may be utilized to determine if there is any correlation between certain types of birth defects and the duration or type of labor involved.

Another type of visual display or chart is illustrated in FIGS. 7. This type of display results from any of the above types of measuring devices described wherein a signal is generated only periodically or a periodic measurement is taken by use of a probe such as that described in FIG. 4. This type of chart also provides a continuous record with some interval between individual measurements.

The cervix measuring devices of this invention are characterized by low voltage operation, i.e. 25 volts and preferably less than 10 volts; lack of physical connections between a signal transmitting device and a signal receiving device; signal frequencies of between about 50 and 1000 KCS and preferably between 100 and 500 KCS.

Although the instant invention has been described hereinabove by reference to specific embodiments, it is not intended to be limited thereto but to include all the variations and modifications falling within the scope of the appended claims.

We claim:

1. An electromagnetic device for measuring cervical dilation comprising:

a. a first miniature induction coil having a resonant frequency between about 50 and 1000 KCS, said first coil having means to attach said coil to the cervix of a prospective mother,
   b. a second miniature coil having a resonant frequency substantially the same as said first coil, said second having means to attach said coil to the cervix of a prospective mother,
   c. calibrated power supply means producing an oscillating current of a frequency substantially matching the resonant frequency of said first miniature induction coil connected to said first miniature induction coil to provide predetermined amounts of induced energy in said second coil at predetermined distances from said first coil,
   d. translation means interconnected with said second coil to translate the intensity of voltage induced in said coil into a visible display linearly proportional to the distance separating said first and second coils.

2. The measuring device of claim 1 wherein the power supply means provides a low voltage, alternating current.

3. The measuring device of claim 2 wherein the power supply means provides an alternating current of less than about 25 volts.

4. The measuring device of claim 2 wherein the power supply means provides an alternating current of less than about 100 milliwatts.

5. The measuring device of claim 1 wherein said translation means comprises a peak follower interconnected with said second coil, a log amplifier interconnected with said peak follower, an anti-log amplifier interconnected with said log amplifier and a visual display device for converting an electrical signal into a visual display.

6. The measuring device of claim 1 wherein the induction coils have a high "Q" and a narrow frequency band pass.

7. The measuring device of claim 6 wherein the power supply means provides an oscillating current at a power of less than about 100 milliwatts, a voltage of less than about 25 volts and at a frequency within the band pass range of said coils.

8. The measuring device of claim 1 wherein each induction coil has a maximum dimension of about one-half inch.

9. A measuring device for measuring cervical dilation comprising:

a. first miniature signal transmitting device having attachment means so said device can be attached to one side of the cervix, said transmitting device generating a signal of a substantially constant frequency.
   b. a second miniature signal transmitting device having attachment means so said device can be attached to the opposite side of said cervix from said first transmitting device, said second transmitting device generating a signal which has a substantially constant frequency different from the frequency of the first transmitting device;
   c. a remote receiving unit which receives an interference frequency transmitted from said transmitting device;
   d. translation means for receiving said interference frequency from said receiving device and translating same to provide a visible display of the interference frequency received by the receiving device, said translation means including a visual display device calibrated to display said interference frequency proportionally to the distance between the first and second transmitting devices.

10. A measuring device for measuring cervical dilation comprising:
a. a miniature magnetic device producing a magnetic field, said device having attachment means to attach said device to the wall of said cervix;
b. a portable moving coil device placeable against the cervical wall opposite said miniature magnetic device having a moveable coil therein;
c. reciprocating means within said moving coil device interacting with said moveable coil to reciprocate said coil;
d. translation means interconnected with said coil for receiving the alternating current from said coil and translating same to provide a visible display of the intensity of the current induced in said coil.

* * * * *